Patented Nov. 16, 1926.

1,607,395

UNITED STATES PATENT OFFICE.

GEORGE GALLASCH, OF ROCHESTER, NEW YORK, ASSIGNOR TO BAUSCH & LOMB OPTICAL COMPANY, OF ROCHESTER, NEW YORK, A CORPORATION OF NEW YORK.

LENS AND METHOD OF MARKING THE SAME.

No Drawing. Application filed September 15, 1924. Serial No. 737,919.

This invention relates to lenses and like articles and to methods of producing a normally invisible marking on the same, one object being to provide a more simple, practical and efficient method for applying to lenses and other polished glass articles a normally invisible marking, such, for example, as a trade-mark or other identifying notation adapted to be readily developed and rendered visible when desired, without normally affecting the optical properties of the surface. Another object is to provide an improved lens more efficiently and economically marked in accordance with the above method. Still a further object is the provision of such a method and article comprising the application of a deleble or temporary visible marking in conjunction with the normally invisible and permanent marking for convenient commercial identification of the lens or other article so marked until put into optical use when the deleble marking may be removed leaving the invisible marking for development when desired.

To these and other ends the invention resides in certain improvements and combinations of parts, all as will be hereinafter more fully described, the novel features being pointed out in the claims at the end of the specification.

The invention provides in an advantageous way for the application of markings for identifying the type grade, name of maker or other characteristics of a glass article, such as an ophthalmic lens, having a polished surface and comprises the modification of the molecular properties of the polished surface at the portions to be marked so that while such portions are normally indistinguishable from adjacent portions they may be rendered visible temporarily by the application of vapor which is condensed differently on the marked and unmarked surfaces as, for example, in larger globules on one of these portions than on the other. Thus a lens or other article of crown, flint or other glass, or combinations of glasses is manufactured and polished in the usual or any suitable manner, as its particular purposes may require. A lens, for example, is manufactured and polished on one or both sides when it is ready for treatment in accordance with the present invention.

During the usual polishing process, certain atoms of the glass molecules nearest the surface are disturbed and some of their electrons join the orbits of the adjacent atoms and thus, for certain atomic-electric reasons, change the characteristic properties of the surface molecules.

It has been found that if such a surface has applied thereto a film of certain substances, such as candelilla wax, bees wax, or Canadian balsam, and is then heated to a suitable temperature, the molecular properties of the glass surface are changed in the desired manner for producing the invisible marking described above. When the glass coated with the substances described is heated, the coating substances appear to train off the electrons described above as having joined the orbits of adjacent atoms. That is to say, when such electrons extend their orbits under the influence of the heating to which the glass is subjected, they are absorbed by the coating substances so that the molecular properties of the glass surface where such substances have been applied is modified or changed relative to adjacent uncoated surface portions, affording different molecular properties which are normally invisible but may be visibly developed as described by the differential condensation of moisture on the glass surface or of benzol from benzol vapor or of other liquids of suitable refractive index capable of condensing from their vapor at a moderate temperature.

The degree to which the glass is heated depends upon the materials employed. It has been found that in the use of a waxy substance or balsam as described, with the usual varieties of lens glass, the heating is preferably carried to a temperature between 200 and 300° Celsius, as may be readily determined by testing for the particular materials employed.

It has been found also that a deleble, temporary, visible marking may be applied in conjunction with the above process for visibly marking the article while being handled, for example, by the manufacturer or dealer, such visible marking being erased from the surface when no longer desired and leaving beneath the invisible marking already described.

A specific example of the process found satisfactory in use comprises the formation of a benzol solution of the wax or balsam and preferably the addition thereto of a pigment, such as nigrosin or the like, suitable proportions being used as will be obvious to those skilled in the art for depositing upon the glass, when the solution dries, of a thin film of the waxy substance or balsam containing sufficient pigment to render the same readily visible.

This coating may be conveniently applied, as, for example, by stamping the same on the glass with an ordinary rubber stamp, any suitable words, letters, figures or symbols being thus quickly and conveniently applied to the lens of other articles after which the latter is transferred to an oven and heated to a relatively high temperature specified above. During such heating the waxy substance or balsam is largely evaporated leaving the pigment to render the marking readily visible. The article is thus easily and economically provided with suitable visible identifying markings which may be readily removed when no longer required by rubbing the glass surface with a fabric dipped if necessary in a solvent such as ether or benzol. The removal of the visible marking leaves the polished surface apparently without marking or any alteration interfering with its optical properties. When moisture, for example, is condensed on the glass, however, the alteration of the molecular properties in the manner described results in a distinct difference in the condensation on the marked and unmarked portions with the result that the marking is rendered clearly visible until such time as the moisture is evaporated or removed.

It is apparent that the invention provides a method of general application, capable of being rapidly accomplished with a minimum of labor and expense, to afford a lens or like article having an efficient form of marking including if desired, a visible, deleble marking as well as a permanent and normally invisible one.

I claim as my invention:

1. The process of applying a normally invisible marking to a glass surface comprising the steps of treating the polished surface of a homogeneous glass body over sections thereof, defining the desired marking by applying thereto a substance adapted to change the molecular properties of the glass under the influence of heat and heating the glass to effect said change in the portions thereof to which said substance is applied.

2. The process of applying a normally invisible marking to a glass surface comprising the steps of applying thereto a wax, balsam or like substance adapted to change the molecular properties of the glass under the influence of heat and heating the glass to a temperature substantially between 200° and 300° Celsius to effect said change in the portions to which said substance is applied.

3. The process of applying a normally invisible marking to a glass surface comprising the steps of treating the portions to be marked with an application of a substance having the properties of candelilla wax, bees wax or Canada balsam and heating the glass to a relatively high temperature while said substance is applied thereto.

4. The process of applying a normally invisible marking to a polished glass surface comprising the steps of stamping the portions to be marked with a thin film of wax, balsam or like substance having the properties described and heating the glass so treated to a temperature of substantially 200 to 300° Celsius.

5. The process of marking a polished glass surface comprising the steps of applying to the portions to be marked a substance containing a deleble, visible marking material and wax, balsam or like material having the properties described and heating the glass so treated to a relatively high temperature.

6. The process of marking a polished glass surface comprising the steps of stamping a mark thereon with a substance containing a visible marking material adapted to be erased and wax, balsam or like material having the properties described and heating the glass so treated to a temperature substantially between 200 and 300° Celsius.

7. A lens having the molecular properties of portions of its surface changed to provide a normally invisible marking adapted to be rendered visible by the application of moisture, and having a deleble visible marking substance applied over said normally invisibly marked portions to afford temporary visibility therefor.

GEORGE GALLASCH.